United States Patent
Oteri et al.

(10) Patent No.: US 12,245,219 B2
(45) Date of Patent: Mar. 4, 2025

(54) SYSTEMS AND METHODS FOR MULTI-PXSCH SIGNALING AT HIGH FREQUENCIES

(71) Applicant: Apple Inc., Cupertino, CA (US)

(72) Inventors: Oghenekome Oteri, San Diego, CA (US); Chunhai Yao, Beijing (CN); Chunxuan Ye, San Diego, CA (US); Dawei Zhang, Saratoga, CA (US); Haitong Sun, Irvine, CA (US); Hong He, Cupertino, CA (US); Huaning Niu, San Jose, CA (US); Seyed Ali Akbar Fakoorian, San Diego, CA (US); Sigen Ye, Whitehouse Station, NJ (US); Wei Zeng, San Diego, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 241 days.

(21) Appl. No.: 17/438,918

(22) PCT Filed: Jan. 14, 2021

(86) PCT No.: PCT/CN2021/071885
§ 371 (c)(1),
(2) Date: Sep. 13, 2021

(87) PCT Pub. No.: WO2022/151234
PCT Pub. Date: Jul. 21, 2022

(65) Prior Publication Data
US 2022/0272724 A1  Aug. 25, 2022

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0012* (2013.01); *H04L 5/0044* (2013.01); *H04W 72/0446* (2013.01); *H04W 72/20* (2023.01)

(58) Field of Classification Search
None
See application file for complete search history.

(56) References Cited

U.S. PATENT DOCUMENTS 10,314,074 B2 *   6/2019  Kim .................... H04W 74/002
2015/0063265 A1 *   3/2015  Seo ........................ H04L 5/003
                                                    370/329

(Continued)

FOREIGN PATENT DOCUMENTS

CN         110913488 A      3/2020

OTHER PUBLICATIONS

International Search Report for PCT/CN2021/071885; Oct. 14, 2021.

(Continued)

*Primary Examiner* — Mariela Vidal Carpio
(74) *Attorney, Agent, or Firm* — Kowert, Hood, Munyon, Rankin & Goetzel, P.C.

(57) ABSTRACT

This disclosure relates to techniques for performing wireless communications including signaling resource allocation for multiple transport blocks (TBs) on either PUSCH or PDSCH using a single control element, such as a DCI. In various scenarios, the multiple TBs may be scheduled either at contiguous or at non-contiguous dime-domain resources. Various mechanisms are disclosed for performing signaling the resource allocation for the multiple TBs without introducing excessive signaling overhead.

16 Claims, 13 Drawing Sheets

| TDRA index | K2 | SLIV | Mapping Type |
|---|---|---|---|
| 1 | {2,3} | S {0,0} L {14,14} | {A,A} |
| 2 | {5,7} | S {3,5} L {5,12} | {B,A} |
| 3 | {1,1,4,6,10} | S {0,7,0,7,7} L {7,7,3,4,5} | {B,A,A,B,A} |

(51) Int. Cl.
*H04W 72/0446* (2023.01)
*H04W 72/20* (2023.01)

(56) References Cited

U.S. PATENT DOCUMENTS

| | | | | |
|---|---|---|---|---|
| 2015/0382364 A1* | 12/2015 | Sharma | ........... | H04W 72/23 |
| | | | | 370/329 |
| 2018/0110062 A1* | 4/2018 | Byun | ........... | H04L 5/0053 |
| 2019/0335480 A1* | 10/2019 | Sun | ........... | H04L 1/1864 |
| 2020/0107345 A1* | 4/2020 | Ang | ........... | H04L 1/0026 |
| 2020/0267745 A1* | 8/2020 | Damnjanovic | ........... | H04L 1/1887 |
| 2020/0314948 A1 | 10/2020 | Babaei | | |
| 2020/0351934 A1 | 11/2020 | Khoshnevisan et al. | | |
| 2021/0100022 A1* | 4/2021 | Zhang | ........... | H04W 72/0453 |
| 2022/0116247 A1* | 4/2022 | Sengupta | ........... | H04L 5/0094 |
| 2022/0399960 A1* | 12/2022 | Bae | ........... | H04L 5/00 |
| 2023/0072342 A1* | 3/2023 | Wang | ........... | H04W 72/23 |
| 2023/0156659 A1* | 5/2023 | Li | ........... | H04W 68/02 |
| | | | | 455/458 |
| 2023/0239851 A1* | 7/2023 | Abotabl | ........... | H04W 72/0453 |
| | | | | 370/329 |
| 2023/0247630 A1* | 8/2023 | Yao | ........... | H04L 1/1812 |
| | | | | 370/329 |
| 2023/0284218 A1* | 9/2023 | Chou | ........... | H04W 72/1273 |
| | | | | 370/329 |
| 2023/0284277 A1* | 9/2023 | Park | ........... | H04W 84/06 |
| | | | | 370/329 |
| 2023/0300893 A1* | 9/2023 | Yoshimura | ........... | H04L 5/0092 |
| | | | | 370/328 |
| 2023/0309110 A1* | 9/2023 | Khoshnevisan | ........... | H04B 7/0639 |
| | | | | 370/329 |
| 2023/0319822 A1* | 10/2023 | Park | ........... | H04W 72/1273 |
| | | | | 370/329 |
| 2023/0396298 A1* | 12/2023 | Bae | ........... | H04B 7/0626 |
| 2024/0073887 A1* | 2/2024 | Bae | ........... | H04W 72/535 |

OTHER PUBLICATIONS

Panasonic "HARQ enhancement for NR-U"; 3GPP TSG RAN WG1 #99 R1-1912771; Reno, US; Nov. 18-22, 2019.
Panasonic "HARQ enhancement for NR-U" 3GPP TSG RAN WG1 #98bis R1-1910840; Chongqing, China; Oct. 14-20, 2019.
Zte et al. "Remaining issues on scheduling and HARQ for NR-U" 3GPP TSG RAN WG1 Meeting #99 R1-1911824; Reno, USA; Nov. 18-22, 2019.
Extended European Search Report for EP 21918442.1; Sep. 9, 2024.
Huawei "Feature lead summary #2 of HARQ enhancements for NR-U," 3GPP TSG RAN WG1 Meeting #98 R1-1909694, Aug. 26, 2019.

* cited by examiner

Common fields

| Identifier for DCI formats |
| --- |
| Carrier indicator |
| Bandwidth part indicator |
| Modulation and coding scheme |
| TPC command for scheduled PUSCH |
| Precoding information and number layers |
| Antenna ports |
| PTRS-DMRS association |
| beta_offset_indicator |
| DMRS sequence initialization |
| HARQ process number |
| Time-Domain RA |

Slot-specific fields

| SRS resource indicator |
| --- |
| SRS request |
| CSI request |
| 1st downlink assignment index |
| 2nd downlink assignment index |

HARQ process ID signaled in the DCI may apply to the first scheduled PUSCH. HARQ process may then be incremented by 1 for subsequent PUSCHs in the scheduled order (with modulo operation as needed)

At least support continuous time domain resource assignment with Type A and Type B PUSCHs.

| TDRA index | K2 | SLIV | Mapping Type |
|---|---|---|---|
| 1 | {2,3,4,5,6} | S {0,0,0,0,0}<br>L {14,14,14,14,14} | {A,A,A,A,A} |
| 2 | {2,4,6,8,10} | S {3,5,11,2,1}<br>L {5,12,3,7,2} | {B,A,B,A,B} |
| 3 | {1,1,4,6,10} | S {0,7,0,7,7}<br>L {7,7,3,4,5} | {B,A,A,B,A} |

{1,1,4,6,10} — M elements may be used

FIG. 9

| TDRA index | K0 | DMRS Position | SLIV | Mapping Type |
|---|---|---|---|---|
| 1 | {2,3,4,5,6} | {2,3,2,3,2} | S {0,0,0,0,0}<br>L {14,14,14,14,14} | {A,A,A,A,A} |
| 2 | {2,4,6,8,10} | {x,2,2,x} | S {3,5,11,2,1}<br>L {5,12,3,7,2} | {B,A,B,A,B} |
| 3 | {1,1,4,6,10} | {x,2,3,x,2} | S {0,7,0,7,7}<br>L {7,7,3,4,5} | {B,A,A,B,A} |

{1,1,4,6,10} — M elements may be used

| TDRA index | K2 | SLIV | Mapping Type |
|---|---|---|---|
| 1 | {2,3} | S {0,0}<br>L {14,14} | {A,A} |
| 2 | {5,7} | S {3,5}<br>L {5,12} | {B,A} |
| 3 | {1,1,4,6,10} | S {0,7,0,7,7}<br>L {7,7,3,4,5} | {B,A,A,B,A} |

FIG. 10

| Bit Value | Offset |
|---|---|
| 0 | -3 |
| 1 | -2 |
| 2 | -1 |
| 3 | 0 |
| 4 | 1 |
| 5 | 2 |
| 6 | 3 |
| 7 | 4 |

FIG. 11

|  |  | Option 1 | Option 2 | Option 3 | Option 4 | Option 5 | Option 6 |
|---|---|---|---|---|---|---|---|
| FDRA |  | 1 | N | 1 | 1 | 1 | 1 |
| TDRA |  | 1 | 1 | 1 | N | 1 | 1 |
|  | K2 | 1 | 1 | N | 1 | 1 | 1 |
|  | S, L | M, N | M, N | M, N | 1 | M, N | M, N |
|  | Mapping | M, N | M, N | M, N | 1 | M, N | M, N |
| MCS |  | 1 | 1 | 1 | 1 | N | 1 |
| NDI |  | N | N | N | N | N | N |
| RV |  | N | N | N | N | N | N |
| HARQ process number |  | 1:inc | 1:inc | 1:inc | 1:inc | 1:inc | N |
| DAI1 |  | N | N | N | N | N | N |
| DAI2 |  | N | N | N | N | N | N |

*FIG. 18*

|  |  | Option 1 | Option 2 | Option 3 | Option 4 | Option 5 |
|---|---|---|---|---|---|---|
| FDRA |  | 1 | N | 1 | 1 | 1 |
| TDRA |  | 1 | 1 | 1 | N | 1 |
|  | K0 | 1 | 1 | N | 1 | 1 |
|  | DMRS Position | N | N | N | 1 | 1 |
|  | S, L | N | N | N | 1 | N |
|  | Mapping | N | N | N | 1 | N |
| MCS1 |  | 1 | 1 | 1 | 1 | N |
| MCS2 |  | 1 | 1 | 1 | 1 | N |
| NDI1 |  | N | N | N | N | N |
| NDI2 |  | N | N | N | N | N |
| RV1 |  | N | N | N | N | N |
| RV2 |  | N | N | N | N | N |
| HARQ process number |  | 1:inc | 1:inc | 1:inc | 1:inc | 1:inc |
| DAI |  | N | N | N | N | N |
| PRI |  | 1 | 1 | 1 | 1 | N |
| K1 |  | 1 | 1 | N | N | 1 |
| CBGTI |  | N | N | N | N | N |
| CBGFI |  | N | N | N | N | N |

*FIG. 19*

SYSTEMS AND METHODS FOR MULTI-PXSCH SIGNALING AT HIGH FREQUENCIES

PRIORITY CLAIM INFORMATION

This application is a national stage application of International Application No. PCT/CN2021/071885, filed on Jan. 14, 2021, titled "Systems and Methods for Multi-PxSCH Signaling at High Frequencies", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to improved signaling for multiple communications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be improving efficiency in signaling multiple transmissions. Improvements in the field are desired.

SUMMARY

Embodiments are presented herein of, inter alia, systems, apparatuses, and methods for transmitting a plurality of PUSCH or PDSCH transmissions using a single control element, such as a DCI.

As noted above, the number of use cases for wireless networks communicating with different classes of user equipment devices (UEs) with widely variable capabilities and usage expectations are growing. One direction in expansion of possible use cases supported by wireless communication techniques may include increasing use of techniques for scheduling multiple communications, e.g., multiple transport blocks on physical uplink share channel (PUSCH) and/or physical downlink share channel (PDSCH) (e.g., multi-PxSCH). A base station scheduling a multi-PxSCH transmission may employ various processes to signal to a UE the resource allocations for the multiple TBs, while avoiding excessive signaling overhead. Such processes are described herein, along with various systems and apparatuses for implementing such processes.

As an example, a method is disclosed for communicating payload data messages in a wireless communication network. A base station of the wireless communication network may transmit a control message indicating downlink transmission resources allocated for a plurality of payload data messages. The base station may then transmit the plurality of payload data messages according to the allocated downlink transmission resources.

In some scenarios, the plurality of payload data messages may be transmitted on a physical downlink shared channel (PDSCH). In some scenarios, the control message may be a downlink control indicator (DCI).

In some scenarios, the allocated downlink transmission resources may include transmission resources that are non-contiguous in time.

In some scenarios, the base station may generate the control message, wherein the generating may include configuring the control message to include allocation of the downlink transmission resources for the plurality of payload data messages in response to determining that at least one payload data message of the plurality of payload data messages will be transmitted within a particular frequency range.

In some scenarios, the control message may include an indication of respective time-domain resources allocated to each of the payload data messages, wherein the indication of respective time-domain resources identifies a respective start time and duration for each of the payload data messages.

In some scenarios, the indication may include an index to a table of resource assignments, wherein the index indicates a single entry of the table that identifies the respective time-domain resources allocated to each of the payload data messages.

In some scenarios, for each of the payload data messages, the indication may include a respective index to a table of resource assignments, wherein each index indicates a different entry of the table, wherein each indicated entry of the table identifies the respective time-domain resources allocated to the associated payload data message.

In some scenarios, the indication may include an index to a table of resource assignments, wherein the index indicates a first entry of the table, the first entry identifying the respective time-domain resources allocated to at least a first of the payload data messages. The indication may also include at least one offset value that identifies a second entry of the table by identifying the position of the second entry relative to the first entry, the second entry identifying the respective time-domain resources allocated to at least a second of the payload data messages;

In some scenarios, each indicated entry of the table may include at least one value indicating a slot in which transmission of a respective payload data message is scheduled to begin, by specifying a delay between the slot in which the control message is transmitted and the slot in which transmission of the respective payload data message is scheduled to begin.

In some scenarios, the first entry of the table may include at least one value indicating a slot in which transmission of a respective first payload data message is scheduled to begin, by specifying a delay between the slot in which the control message is transmitted and the slot in which transmission of the respective first payload data message is scheduled to begin. The second entry of the table may include at least one value indicating a slot in which transmission of a respective second payload data message is scheduled to begin, by specifying a delay between the slot in which the latest of the respective first payload data messages is scheduled to begin and the slot in which each respective second payload data message is scheduled to begin.

In some scenarios, the indication may include a first index to a first table of time-domain resource assignments, wherein the first index indicates an entry of the first table, wherein the entry of the first table includes at least one value indicating a slot in which transmission of a respective first payload data message is scheduled to begin, by specifying a delay between the slot in which the control message is transmitted and the slot in which transmission of the respective first payload data message is scheduled to begin. The indication may also include a second index to a second table of time domain resource assignments, the second index occupying less bits of the control message than the first index, wherein the second index indicates an entry of the second table, wherein the entry of the second table includes at least one value indicating a slot in which transmission of a respective second payload data message is scheduled to begin, by specifying a delay between the slot in which the latest of the respective first payload data messages is scheduled to begin and the slot in which each respective second payload data message is scheduled to begin.

In some scenarios, for each of the payload data messages, the control message may further indicate a resource allocation for transmitting an acknowledgement (ACK) feedback message responsive to the respective payload data message.

In some scenarios, the control message may include an indication of a frequency hopping configuration for each transport time interval (TTI).

In some scenarios, the base station may transmit a second control message indicating uplink transmission resources allocated for a second plurality of payload data messages, and receive the second plurality of payload data messages according to the allocated uplink transmission resources. In some such scenarios, the second plurality of payload data messages may be received on a physical uplink shared channel (PUSCH).

As another example, a method is disclosed for communicating payload data messages in a wireless communication network. A base station of the wireless communication network may transmit a control message indicating uplink transmission resources allocated for a plurality of payload data messages, wherein the uplink transmission resources are non-contiguous in the time domain. The base station may also receive the plurality of payload data messages according to the allocated uplink transmission resources.

In some scenarios, the control message may include an indication of respective time-domain resources allocated to each of the payload data messages, wherein the indication of respective time-domain resources identifies a respective start time and duration for each of the payload data messages.

Apparatuses and systems are disclosed for implementing any of the preceding methods, among other methods disclosed herein.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 5-7 illustrate aspects of multi-PUSCH scheduling, according to some embodiments;

FIGS. 8-10 illustrate portions of example TDRA tables for signaling resource allocation for multi-PxSCH transmissions, according to some embodiments;

FIG. 11 illustrates an example of a differential index offset table, according to some embodiments;

FIG. 18 is a table illustrating various UL parameters that may be signaled in a DCI, as well as various options for signaling those parameters to accommodate multiple PUSCHs, according to some embodiments.

FIG. 19 is a table illustrating various DL parameters that may be signaled in a DCI, as well as various options for signaling those parameters to accommodate multiple PDSCHs, according to some embodiments.

Figure 1:
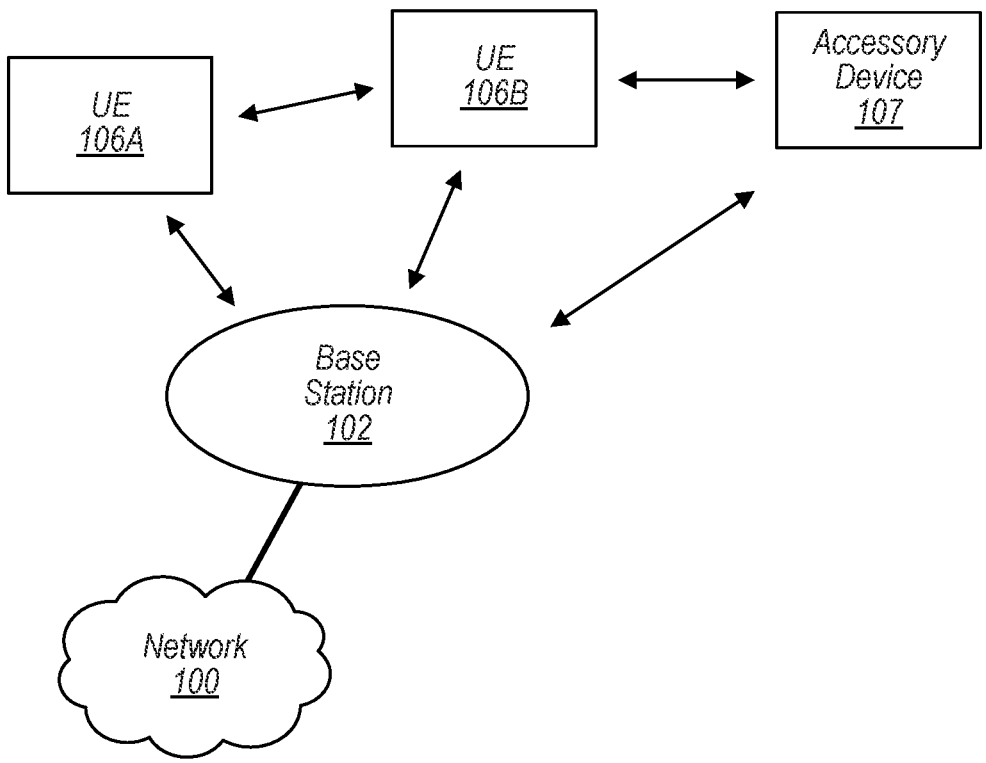
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.
  3GPP: Third Generation Partnership Project
  CBGFI: Codebook Group Flushing Index
  CBGTI: Codebook Group Transmission Index
  CE: Control Element
  DAI: Downlink Assignment Index
  DCI: Downlink Control Indicator
  DL: Downlink
  FDRA: Frequency Domain Resource Allocation
  GSM: Global System for Mobile Communications
  HARQ: Hybrid Automatic Repeat reQuest
  LTE: Long Term Evolution
  MAC: Media Access Control
  MCS: Modulation and Coding Scheme
  NDI: New Data Indicator
  PDSCH: Physical Downlink Shared Channel
  PRI: PUCCH Resource Indicator
  PUCCH: Physical Uplink Control Channel
  PUSCH: Physical Uplink Shared Channel
  PxSCH: Refers to either PDSCH or PUSCH
  RRC: Radio Resource Control
  RV: Redundancy Version
  SCS: Subcarrier Spacing
  TDRA: Time Domain Resource Allocation
  TTI: Transmission Time Interval
  UL: Uplink
  UMTS: Universal Mobile Telecommunications System

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
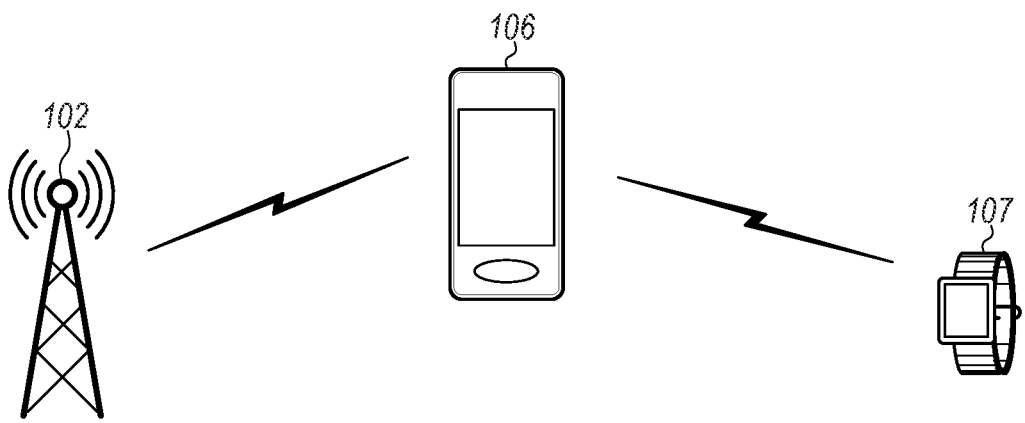
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
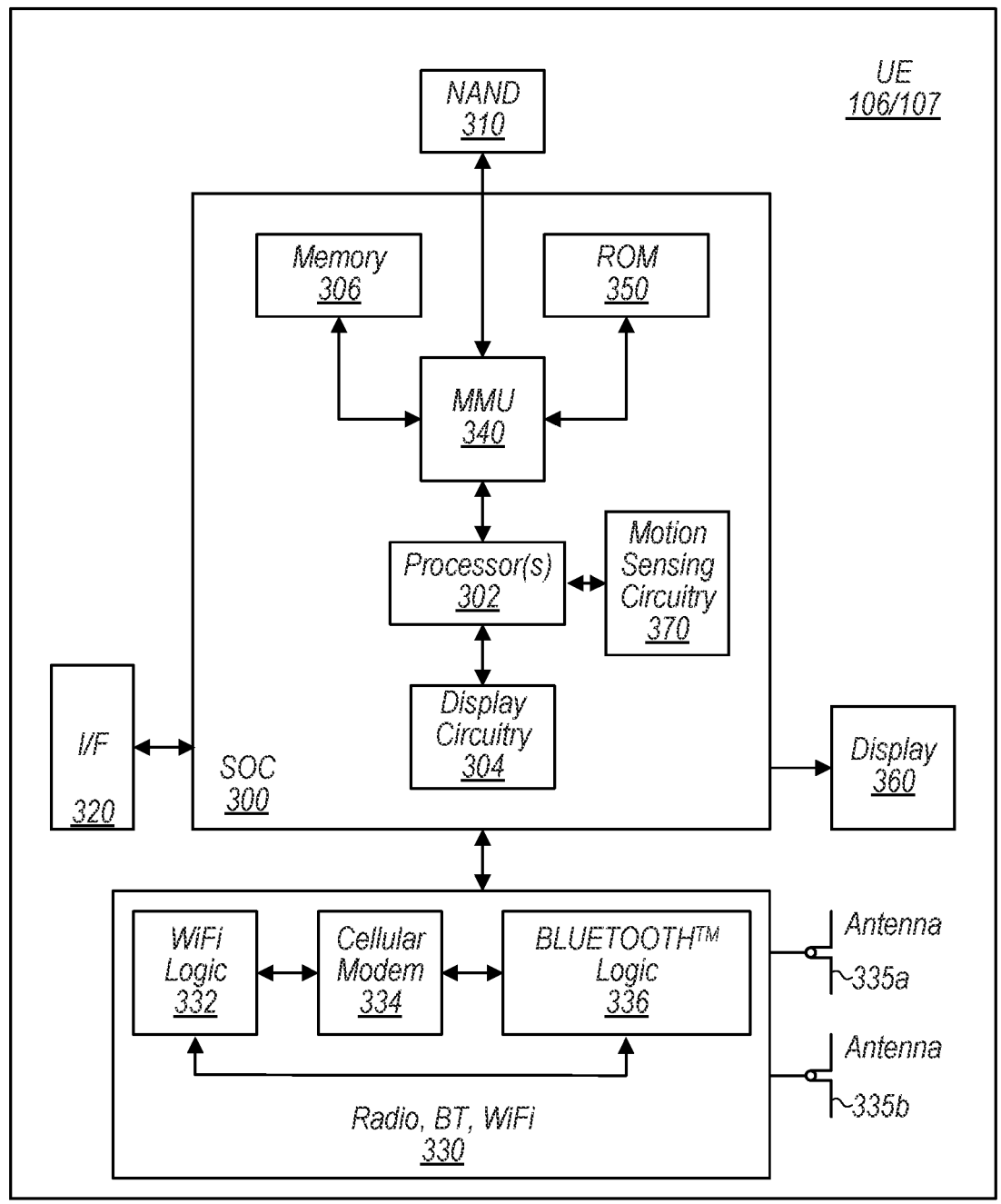
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
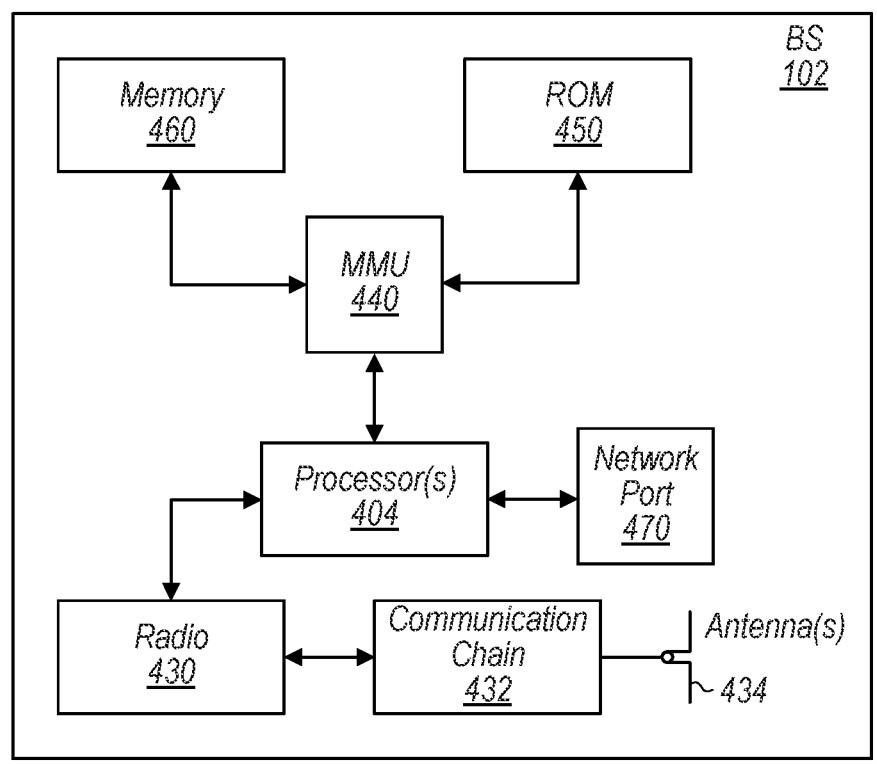
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone, network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
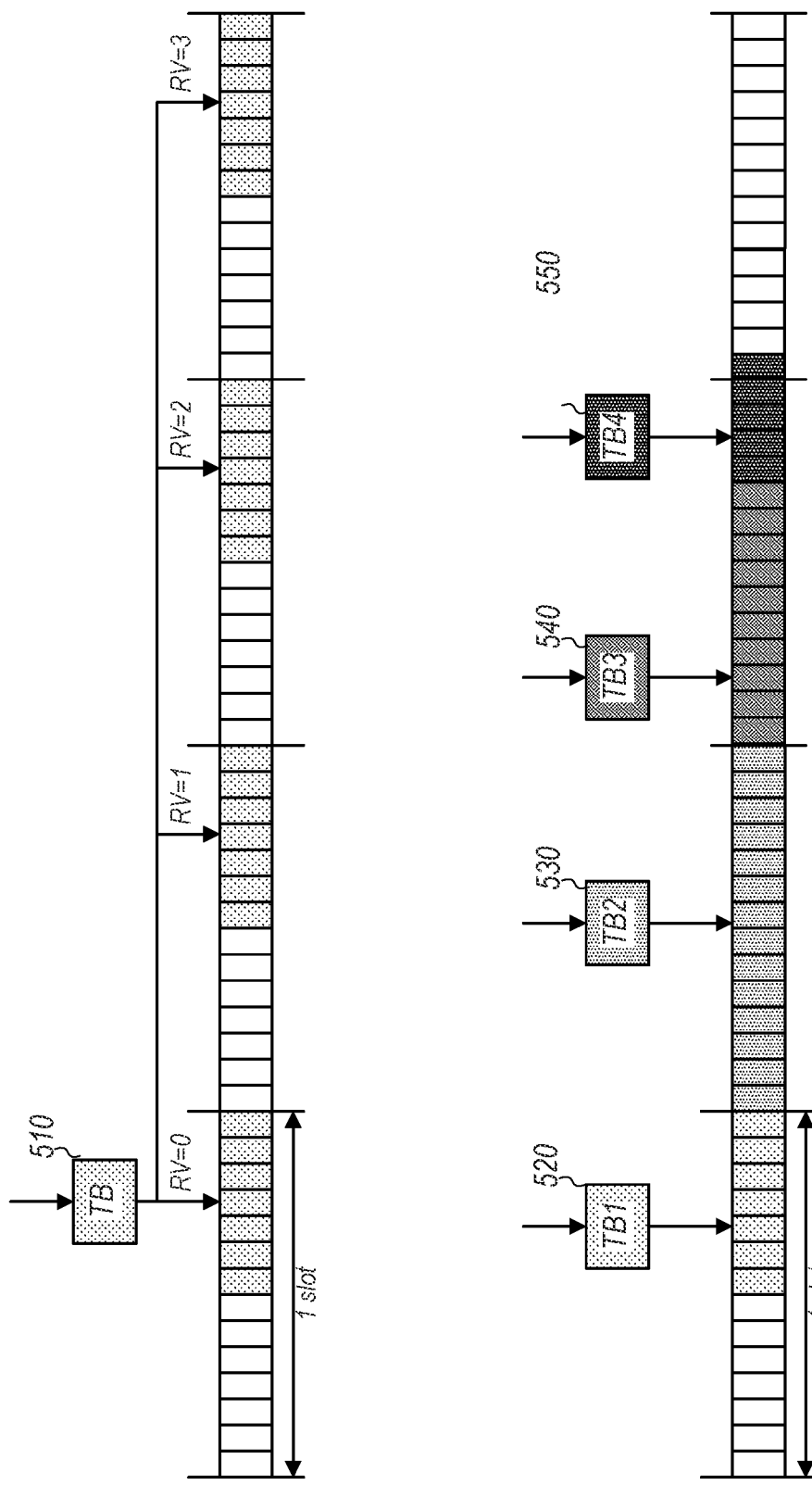
Figure 7:
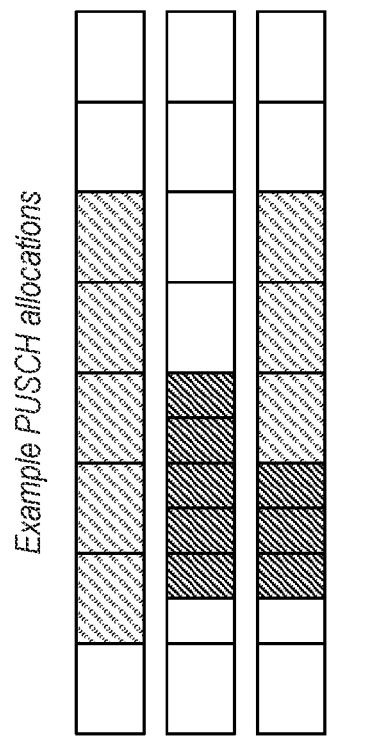

FIGS. 5-7—Scheduling Multiple Communications

Scheduling of multiple communications using a single scheduling message may allow for reduced overhead, e.g., relative to individual scheduling of the communications. Accordingly, wireless communications such as new radio (NR) and NR-unlicensed (NR-U) may support means of scheduling multiple uplink (UL) and/or downlink (DL) communications (e.g., to occur over a period of time) using a single scheduling message. For example, a base station may schedule multiple physical UL shared channel (PUSCH) and/or physical DL shared channel (PDSCH) messages (e.g., multi-PxSCH messages may refer to multiple UL and/or DL communications on the respective shared channels) together.

FIG. 5 illustrates examples of multi-PUSCH scheduling, according to some embodiments. As shown, in a first example, a PUSCH transmission transport block (TB) 510 may be scheduled to repeat in multiple transmission time intervals (e.g., multi-TTI PUSCH transmission or multi-PUSCH transmission). This repetition in time may support reliability (e.g., for ultra reliable low latency communication (URLLC) services) or otherwise ensure UL coverage. As used herein, references to a "PDSCH" or a "PDSCH message" may refer to a TB transmitted on the PDSCH. Similarly, references to a "PUSCH" or a "PUSCH message" may refer to a TB transmitted on the PUSCH.

In a second example, multi-TTI PUSCH transmission may be used to schedule multiple slots and/or mini-slots with different TBs (e.g., 520, 530, 540, and 550) using a single UL grant. The TBs may be scheduled at aperiodic times. This may allow for higher efficiency. For example, when using unlicensed spectrum, scheduling the TBs sequentially may allow for increased UL transmissions probability, e.g., because other users may not contend for the spectrum between transmissions. Presently, 3GPP standards provide for transmission of multiple TBs on the PUSCH based on a single UL grant (e.g., signaled by a single DCI) only within such sequential (i.e., contiguous) transmissions, e.g., in unlicensed frequency ranges.

FIG. 6 illustrates various fields from an example DCI that may be used to schedule such a contiguous multi-PUSCH transmission. In some scenarios, the illustrated fields may be included in an information element or other message for time domain resource allocation (TDRA), such as: pusch-TimeDomainAllocationListForMultiPUSCH, and/or PUSCHTimeDomainResourceAllocationList-r16, among various possibilities. Such fields may be used to configure a TDRA table for multi-PUSCH scheduling.

FIG. 7 illustrates an example portion of a TDRA table that may be used for scheduling such a contiguous multi-PUSCH transmission, according to some embodiments. As shown, a plurality of TDRA index values may be configured with various parameters. The parameters may include K2 (e.g., a delay between the DCI and the slot at which the applicable PDSCH will be transmitted, e.g., measured in slots), S (e.g., the symbol at which a particular communication starts), L (e.g., the length of each communication, e.g., in symbols), and mapping type. S and L may be referred to as start and length indicator value (SLIV). Additional or different fields may be included as desired. Further the time units may be different, etc.

In some embodiments, multi-TTI PUSCH scheduling may use DCI format 0_1. The TDRA table configuration may allow indicating single or multiple continuous PxSCHs in any slot of the multiple scheduled slots.

In some embodiments, a maximum number of PxSCH in a row may be set. For example, such a maximum may be 8, among various possibilities.

In some embodiments, a number of new data indicator (NDI) bits and/or redundancy version (RV) bits in DCI format 0_1 may be determined based on the configured TDRA table. For example, one RV bit per PxSCH may be used in case multiple PxSCHs are scheduled. The RV may be one value of {0, 2}. Two RV bits for the PxSCH may be used in case only a single PxSCH is scheduled.

In some embodiments, the TDRA table may be extended such that each row indicates multiple PxSCHs (e.g., continuous in time-domain). Each PxSCH may have a separate SLIV and mapping type. The number of scheduled PxSCHs may be signaled by the number of indicated valid SLIVs in the row of the TDRA table signaled in DCI.

Dynamic PxSCH Scheduling Parameters

In some scenarios, further improvements are desired to allow more efficient scheduling of multiple communications using a single control element, such as a single DCI. For example, at high frequencies (e.g., above 52.6 GHz), the phase noise increases, which may encourage system designers to compensate by increasing the size of subcarrier spacing (SCS). For example, new SCS candidates may be introduced, such as 480 kHz and/or 960 kHz. This, in turn, reduces the symbol duration, resulting in a higher number of shorter symbols, relative to communicating the same quantity of data at lower frequencies. This may result in higher scheduling overhead, as larger numbers of signals need to be scheduled. It may be noted that scheduling each PUSCH and PDSCH via a separate DCI would waste resources, at least because many of the parameters signaled would be redundant across the respective DCIs. It may therefore be advantageous to schedule multiple PUSCHs and/or multiple PDSCHs (i.e., multiple PxSCHs) via a single DCI, e.g., to reduce scheduling overhead.

Additionally, it may be advantageous to allow for signaling the scheduling of the multiple PxSCHs in either a contiguous or non-contiguous manner. For example, spacing out the scheduled transmissions may allow for pre-scheduling of expected DL data (e.g., across multiple slots) that has not yet arrived in a DL buffer. As another example, a transmitter may be scheduled to transmit multiple beams to a single receiver within a scheduling unit, e.g., where the scheduling unit may include multiple slots, rather than a single slot, to compensate for the reduction in symbol duration with increasing SCS. Non-contiguous scheduling of PxSCHs may allow for a gap between the transmissions, to accommodate the downtime experienced during beam switching. As yet another example, a transmitter may be scheduled to transmit to multiple receivers that have various timing requirements that necessitate interleaved scheduling of the receivers to satisfy the timing requirements. Thus, the transmissions scheduled for a given receiver may be non-contiguous.

In order to schedule a multiple PxSCH transmission between a base station (such as the base station 102) and a UE (such as the UE 106), both entities should be aware of the parameters for the transmission. Because the base station typically schedules the transmissions, this may include the base station notifying the UE of the resource allocations and/or other applicable parameters.

As a first option, a single DCI may be used to schedule multiple PDSCHs, or a single DCI may be used to schedule multiple PUSCHs.

As a second option, a single DCI may be used to schedule multiple PDSCHs and/or multiple PUSCHs (i.e., multiple PxSCHs).

As a third option, one or more RRC parameter(s) may be introduced to enable multi-PDSCH and/or multi-PUSCH scheduling separately or jointly. For example, the one or more RRC parameter(s) may select between the first and second options. This may be configured, e.g., per UE, per component carrier (CC), per bandwidth part (BWP), per CORESET/SS, etc. As another example, RRC parameters may select between the first and second options by configuring TDRA table entries. For example, a given TDRA index could indicate scheduling of x PUSCH messages and/or y PDSCH messages.

Signaling multiple PxSCHs in a single DCI may involve modifying the DCI from its traditional form. For example, the DCI may be modified to include UL and/or DL parameters for each PxSCH, or to otherwise indicate the parameters to apply to each PxSCH.

FIG. 18 illustrates various UL parameters that may be signaled in a DCI, as well as various options for signaling those parameters to accommodate multiple PUSCHs.

In FIG. 18, the first column indicates the parameter to be referenced. The second column indicates parameters included within a TDRA table, which may be signaled with reference to the TDRA index parameter included in the DCI. Each remaining column indicates one option for signaling those parameters to accommodate multiple PUSCHs. It should be understood that the options shown are examples, and additional examples are also envisioned.

Option 1 illustrates a possible parameter configuration suitable for transmitting multiple PUSCHs that are contiguous in time.

The frequency domain resource allocation (FDRA) parameter may include an index to an FDRA table, which may include a set of indexed rows, in which each row may indicate frequency-domain resources. A DCI may include an FDRA index to indicate the corresponding frequency-domain resources for use with the signaled PUSCHs. The FDRA may use a bitmap to indicate a specific Resource Block Group (RBG), which includes a set of contiguous virtual resource blocks that map to specific (possibly non-contiguous) physical resource blocks. This is referred to as Type 0 allocation. The FDRA may also, or alternatively, use a Resource Indication Value (RIV) that indicates the starting allocated resource block and number of virtual resource blocks allocated to the UE. The virtual resource block may then be mapped to a set of physical resource blocks, e.g., using non-interleaved mapping. This is referred to as Type 1 allocation. As shown in option 1, the FDRA index may be included once for all PUSCHs signaled by the DCI.

The TDRA parameter may include an index (e.g., 6 bits) to a TDRA table, which may be similar to that illustrated in FIG. 7. For example, the TDRA table may include a set of indexed rows, in which each row may indicate time-domain resources. A DCI may include a TDRA index to indicate the corresponding time-domain resources for use with a signaled PUSCH message. As shown in option 1, the TDRA index may be included once for all PUSCHs signaled by the DCI. In some scenarios, the TDRA parameter may be, or include a pusch-TimeDomainAllocationListForMulti-PxSCH field, and/or a PUSCHTimeDomainResourceAllocationList-r17 field.

The row of the TDRA table that is indicated by the TDRA index may include a set of time-domain resource parameters, such as K2 (e.g., a delay between the DCI and the slot at which the applicable PDSCH will be transmitted, e.g., measured in slots), S (e.g., the symbol within the slot at which a particular communication starts), L (e.g., the length of each communication, e.g., in symbols), and mapping type. The parameters S and L may be referenced together as "SLIV". Values of K2, SLIV, and mapping type may be configured by RRC messaging. Because, in option 1, the PUSCHs are contiguous in time, the RRC messaging may signal a single K2 value (e.g., for the first PUSCH), and the values for each subsequent PUSCH may follow contiguously. For each of SLIV and mapping type, the RRC messaging may signal N values, where N is the number of PUSCHs to be signaled in the DCI (or the maximum number of PUSCHs that may be signaled). Thus, each row of the TDRA table may include N values of K2, SLIV, and mapping type, while the RRC messaging may include only 1 value of K2, and N values of each of SLIV and mapping type. In some scenarios, the DCI may include an additional value M (where M<N), which indicates the number of entries to use from each of the values listed for K2, SLIV, and mapping type. In this way, the TDRA table may be configured to allocate resources for N PUSCHs, but the DCI may signal that resources have actually been allocated for only a lesser number (M) of PUSCHs.

The modulation and coding scheme (MCS) parameter may include an index (e.g., 5 bits) to an MCS index table, which may include a set of indexed rows, in which each row may indicate modulation and coding parameters such as modulation order, target code rate, and/or spectral efficiency. A DCI may include an MCS index to indicate the corresponding modulation and coding parameters for use with a signaled PUSCH message. As shown in option 1, the DCI may include a single MCS parameter for all PUSCHs signaled by the DCI.

The new data indicator (NDI) parameter (e.g., 1 bit) may indicate whether the PUSCH includes new data, or is a retransmission of previously transmitted data. As shown in option 1, the DCI may include N NDI parameters; e.g., a distinct NDI parameter for each of the PUSCHs signaled by the DCI.

The redundancy version (RV) parameter (e.g., 2 bits) may include a particular set of systematic and parity bits for use with HARQ procedures. As shown in option 1, the DCI may include N RV parameters; e.g., a distinct RV parameter for each PUSCHs signaled by the DCI.

The HARQ process number parameter (e.g., 4 bits) may identify the HARQ process of a PUSCH signaled by the DCI. As shown in option 1, the DCI may signal only a single HARQ process number parameter, e.g., identifying the HARQ process of the first PUSCH signaled by the DCI. The HARQ process number may be incremented for each subsequent PUSCH.

The downlink assignment index (DAI) identifies the sequence number of a PUSCH within a HARQ bundle. In some scenarios, the DAI may be defined using two fields, DAI1 and DAI2. For example, when a semi-static codebook is used, DAI1 may include 1 bit to indicate whether the HARQ-ACK codebook is multiplexed with the PUSCH, and DAI2 may be omitted (e.g., may include 0 bits). When a dynamic codebook is used, DAI1 may include 2 bits indicating the total DAI for carriers that are not using codebook block groups (CBGs) (e.g., the first sub-codebook), and DAI2 may include 2 bits indicating the total DAI for carriers that are using CBGs (e.g., the second sub-codebook). As shown in option 1, the DCI may signal N versions of the DAI1 parameter and N versions of the DAI2 parameter; e.g., one DAI1 parameter and one DAI2 parameter for each of the PUSCHs signaled by the DCI.

Other UL parameters, not shown in FIG. 18, may also be signaled, e.g., by the DCI. For example, the DCI may include a priority parameter, which may indicate whether a PUSCH, or a multi-PUSCH transmission, is low-priority or high-priority. As another example, the DCI may include N codebook group transmission index (CBGTI) parameters (e.g., one for each scheduled PUSCH), wherein each CBGTI includes one bit per CBG, which may indicate whether the applicable CBG is to be transmitted.

Option 2 illustrates a possible parameter configuration suitable for transmitting multiple PUSCHs that are contiguous in time, in which the frequency-domain parameters may be configured separately for each PUSCH signaled by the DCI. As shown in option 2, the parameters are the same as those of option 1, except that the DCI may signal N values indicating FDRA configurations (e.g., N FDRA indexes), e.g., one for each of the PUSCHs signaled by the DCI. This may allow, for example, independent selection of frequency hopping configuration for each PUSCH. In some scenarios, the frequency to be used for a first PUSCH signaled by the DCI may be indicated by a normal FDRA index, but the frequency to be used for a subsequent PUSCH (e.g., in a frequency-hopping configuration) may be indicated as a frequency offset, e.g., using a frequency-domain offset table, as discussed further below. This may reduce the overhead needed to communicate FDRA parameters for each PUSCH signaled by the DCI.

In some scenarios, the changes shown for option 2 to the FDRA parameters included in the DCI may be applied in combination with any of options 3-6. For example, option 2 may be combined with either of examples 3-4 for use in transmitting multiple PUSCHs that are non-contiguous in time.

Option 3 illustrates a possible parameter configuration suitable for transmitting multiple PUSCHs that are not constrained to be contiguous in time. Specifically, as shown in option 3, the parameters are the same as those of option 1, except that the TDRA table may be configured (e.g., via RRC messaging) to include N (e.g., independent) values of K2. This may allow the TDRA table to include K2 values that are spaced apart in time sufficient to result in non-contiguous PUSCHs. This may increase the flexibility of scheduling the PUSCHs, but may also increase the complexity of the TDRA table, and the size of RRC messages.

In some scenarios, the changes shown for option 3 to the K2 parameters may be applied in combination with any of options 2 and/or 4-6.

Option 4 illustrates another possible parameter configuration suitable for transmitting multiple PUSCHs that are not constrained to be contiguous in time. Specifically, as shown in option 4, the parameters are the same as those of option 1, except that the DCI may signal N values indicating TDRA table entries, and the TDRA table entries for K2, SLIV, and mapping may each include a single value. For example, the DCI may include a normal TDRA index (e.g., 6-bits) for each of the N PUSCHs, to indicate a row of the TDRA table containing the TDRA parameters to be used for the respective PUSCH. However, this would increase the size of the DCI by 6*(N−1). Therefore, more efficient signaling may be desired. As an alternative example, the DCI may include a normal TDRA index only for the first PUSCH. For subsequent PUSCHs, the DCI may include an indication of an offset value (e.g., 1-, 2-, or 3-bits) relative to the first TDRA index, e.g., as discussed further below. This may reduce the overhead needed to communicate TDRA parameters for each PUSCH signaled by the DCI.

Because each PUSCH in option 4 may be configured with its own TDRA parameter, the TDRA table need not include a plurality of K2, SLIV, and mapping type parameters on each row. Therefore, each entry for K2, SLIV, and mapping type parameters may contain a single value.

In some scenarios, the changes shown for option 4 to the TDRA parameters may be applied in combination with any of options 2-3 and/or 5-6.

Option 5 illustrates a possible parameter configuration suitable for transmitting multiple PUSCHs that are contiguous in time, in which the MCS parameters may be configured separately for each PUSCH signaled by the DCI. As shown in option 5, the parameters are the same as those of option 1, except that the DCI may signal N values indicating MCS configurations (e.g., N MCS indexes), e.g., one for each of the PUSCHs signaled by the DCI. This may allow independent selection of MCS configuration for each PUSCH.

In some scenarios, the changes shown for option 5 to the MCS parameters included in the DCI may be applied in combination with any of options 2-4 and/or 6. For example, option 5 may be combined with either of examples 3-4 for use in transmitting multiple PUSCHs that are non-contiguous in time.

Option 6 illustrates a possible parameter configuration suitable for transmitting multiple PUSCHs that are contiguous in time, in which the HARQ process number parameters may be configured separately for each PUSCH signaled by the DCI. As shown in option 6, the parameters are the same as those of option 1, except that the DCI may signal N values indicating HARQ process number, e.g., one for each of the PUSCHs signaled by the DCI. This may allow independent signaling of HARQ process number for each PUSCH. In some scenarios, it may be assumed that the HARQ process number of each PUSCH will fall within a known range of the HARQ process number of the preceding PUSCH. In such scenarios, signaling overhead may be reduced by expressly indicating the HARQ process number of the first PUSCH, and then identifying the HARQ process number of each subsequent PUSCH by indicating a differential value (e.g., 2-bits) relative to the HARQ process number of the preceding PUSCH.

In some scenarios, the changes shown for option 6 to the MCS parameters included in the DCI may be applied in combination with any of options 2-5. For example, option 6 may be combined with either of examples 3-4 for use in transmitting multiple PUSCHs that are non-contiguous in time.

FIG. 19 illustrates various DL parameters that may be signaled in a DCI, as well as various options for signaling those parameters to accommodate multiple PDSCHs.

In FIG. 19, the first column indicates the parameter to be referenced. The second column indicates parameters included within a TDRA table, which may be signaled with reference to the TDRA index parameter included in the DCI. Each remaining column indicates one option for signaling those parameters to accommodate multiple PDSCHs. It should be understood that the options shown are examples, and additional examples are also envisioned.

Many of the parameters shown in FIG. 19 also appeared in FIG. 18, and may operate substantially as described in connection with FIG. 18, except that the parameters shown in FIG. 19 relate to PDSCH messages, rather than to PUSCH messages, as in FIG. 18.

Option 1 illustrates a possible parameter configuration suitable for transmitting multiple PDSCHs that are contiguous in time.

The FDRA parameter may include an index to a FDRA table, and a DCI may include a FDRA index to indicate the corresponding frequency-domain resources for use with the signaled PDSCHs, substantially as described in connection with FIG. 18. As previously described, the FDRA may use a bitmap to indicate a specific RBG (Type 0 allocation), and may also use an RIV (Type 1 allocation). Note that, for Type 1 allocation, both "interleaved" and "non-interleaved" mappings may be allowed, as opposed to only "non-interleaved" for the uplink case. As shown in option 1, the FDRA index may be included once for all PDSCHs signaled by the DCI.

The TDRA parameter may include an index (e.g., 4 bits) to a TDRA table, substantially as described in connection with FIG. 18. A DCI may include a TDRA index to indicate the corresponding time-domain resources for use with a signaled PDSCH message. As shown in option 1, the TDRA index may be included once for all PDSCHs signaled by the DCI.

However, a TDRA table for a PDSCH may include some parameters that are different than those included in a TDRA table for a PUSCH. For example, a row of the TDRA table that is indicated by the TDRA index may include a set of time-domain resource parameters, such as K0 (e.g., a delay between the DCI and the slot at which the applicable PDSCH will be transmitted, e.g., measured in slots) and demodulation reference signal (DMRS) position (e.g., indication of the location of the DMRS), in addition to SLIV and mapping type. These values may be configured by RRC messaging. Because, in option 1, the PDSCHs are contiguous in time, the RRC messaging may signal a single K0 value (e.g., for the first PDSCH), and the values for each subsequent PDSCH may follow contiguously.

The MCS1 and MCS2 parameters (e.g., 5 bits each) may operate substantially as described in connection with FIG. 18. The DL parameters may include two MCS fields because DL transmissions may include two layers. Similarly, the NDI (NDI1 and NDI2), RV (RV1 and RV2), HARQ process number, and DAI parameters may operate substantially as described in connection with FIG. 18.

The PUCCH resource indicator (PRI) parameter (e.g., 3 bits) may include an index to a predefined PUCCH resource set, e.g., provided via RRC messaging. The entry of the PUCCH resource set indexed by the PRI parameter may identify one or more resource for an associated PUCCH message, e.g., to carry ACK/NACK information regarding the applicable PDSCH(s). As shown in option 1, the DCI may signal one version of the PRI to identify a PUCCH resource for use with all of the PDSCHs signaled by the DCI.

The K1 parameter (e.g., 3 bits) may indicate a delay between the slot allocated for transmission of the PDSCH message and the slot at which the UE may transmit ACK/NACK feedback for that PDSCH message. As shown in option 1, the DCI may signal one version of the K1 parameter for use with all of the PDSCHs signaled by the DCI. For example, the single K1 parameter may indicate that a respective HARQ-ACK transmission is scheduled K1 slots after each PDSCH message. As another example, the single K1 parameter may indicate that a single combined HARQ-ACK transmission is scheduled K1 slots after the last scheduled PDSCH message.

The CBGTI parameter may operate substantially as described in connection with FIG. 18. Additionally, the DCI may include N codebook group flushing index (CBGFI) parameters (e.g., one for each scheduled PUSCH), wherein each CBGFI includes one bit per CBG. The CBGFI may indicate whether the applicable CBG is to be flushed.

Other DL parameters, not shown in FIG. 19, may also be signaled, e.g., by the DCI. For example, the DCI may include a priority parameter, which may indicate whether a PDSCH, or a multi-PDSCH transmission, is low-priority or high-priority. As another example, the DCI may include a service request indicator (SRI), precoding information and layers, and/or antenna port indications.

Option 2 illustrates a possible parameter configuration suitable for transmitting multiple PUSCHs that are contiguous in time, in which the frequency-domain parameters may be configured separately for each PDSCH signaled by the DCI. As shown in option 2, the parameters are the same as those of option 1, except that the DCI may signal N values indicating FDRA configurations (e.g., N FDRA indexes), e.g., one for each of the PDSCHs signaled by the DCI. This may allow, for example, independent selection of frequency hopping configuration for each PDSCH. In some scenarios, the frequency to be used for a first PDSCH signaled by the DCI may be indicated by a normal FDRA index, but the frequency to be used for a subsequent PDSCH (e.g., in a frequency-hopping configuration) may be indicated as a frequency offset, e.g., using a frequency-domain offset table, as discussed further below. This may reduce the overhead needed to communicate FDRA parameters for each PDSCH signaled by the DCI.

In some scenarios, the changes shown for option 2 to the FDRA parameters included in the DCI may be applied in combination with any of options 3-5. For example, option 2 may be combined with either of examples 3-4 for use in transmitting multiple PUSCHs that are non-contiguous in time.

Option 3 illustrates a possible parameter configuration suitable for transmitting multiple PDSCHs that are not constrained to be contiguous in time. Specifically, as shown in option 3, the parameters are the same as those of option 1, except that the TDRA table may be configured (e.g., via RRC messaging) to include N (e.g., independent) values of K0, and the DCI may indicate N values of K1. Providing N values of K0 and K1 may allow the TDRA table to include K0 values that are spaced apart in time sufficient to result in non-contiguous PDSCHs, and to also signal PUCCH feedback instances for each of these PDSCHs. This may increase the flexibility of scheduling the PDSCHs, but may also increase the complexity of the TDRA table, and the size of RRC messages.

In some scenarios, signaling overhead of providing N values of K1 may be reduced by defining an index table of K1 values. As one example, the DCI may include N entries into this index table. As another example, the signaling overhead may be further reduced by configuring the DCI to include one full entry into this index table, e.g., for the first PDSCH, and then signaling the remaining N−1 indexes by signaling an offset from the first index. As yet another example, the table may be configured to include N K1 values, such that a single table index may indicate K1 values for each PDSCH signaled by the DCI.

In some scenarios, the changes shown for option 3 to the K0 parameters may be applied in combination with any of options 2 and/or 4-5.

Option 4 illustrates another possible parameter configuration suitable for transmitting multiple PDSCHs that are not constrained to be contiguous in time. Specifically, as shown in option 4, the parameters are the same as those of option 1, except that the DCI may signal N values indicating TDRA table entries, and the TDRA table entries for K2, SLIV, and mapping may each include a single value. For example, the DCI may include a normal TDRA index (e.g., 6-bits) for each of the N PDSCHs, to indicate a row of the TDRA table containing the TDRA parameters to be used for the respective PDSCH. However, this would increase the size of the DCI by 4*(N−1). Therefore, more efficient signaling may be desired. As an alternative example, the DCI may include a normal TDRA index only for the first PDSCH. For subsequent PDSCHs, the DCI may include an indication of an offset value (e.g., 1- or 2-bits) relative to the first TDRA index, e.g., as discussed further below. This may reduce the overhead needed to communicate TDRA parameters for each PDSCH signaled by the DCI.

Because each PDSCH in option 4 may be configured with its own TDRA parameter, the TDRA table need not include a plurality of K0, DMRS position, SLIV, and mapping type parameters on each row. Therefore, each entry for K0, DMRS position, SLIV, and mapping type parameters may contain a single value.

Additionally, in option 4, the DCI may indicate N values of K1, e.g., according to any of the examples described in connection with option 3.

In some scenarios, the changes shown for option 4 to the TDRA parameters may be applied in combination with any of options 2-3 and/or 5.

Option 5 illustrates a possible parameter configuration suitable for transmitting multiple PDSCHs that are contiguous in time, in which the MCS and PRI parameters may be configured separately for each PDSCH signaled by the DCI. As shown in option 5, the parameters are the same as those of option 1, except that the DCI may signal N sets of MCS1 and MCS2 parameters and N PRI parameters, e.g., one for each of the PUSCHs signaled by the DCI. This may allow independent selection of MCS configuration for each PUSCH. It may be noted that changing the MCS parameters and the PRI parameter together, as in option 5 may be advantageous, as both parameters may affect K1 and the timing of HARQ-ACK feedback.

In some scenarios, signaling overhead of providing N values of PRI may be reduced by including in the DCI a first PRI parameter, e.g., for the first PDSCH, and then signaling an offset value from that index for each subsequent PDSCH. As another example, the DCI may include only a first PRI parameter, e.g., for the first PDSCH, and the UE may increment the index value for each subsequent PDSCH.

In some scenarios, the changes shown for option 5 to the MCS and PRI parameters included in the DCI may be applied in combination with any of options 2-4. For example, option 5 may be combined with either of examples 3-4 for use in transmitting multiple PUSCHs that are non-contiguous in time.

Further details will now be discussed regarding implementation of the preceding options for PxSCH parameter signaling.

FIGS. 8-9—Time-Domain Enhancements Using Additional Signaling

As outlined above, multi-transmission time interval (TTI) PxSCH scheduling may be achieved, e.g., by modifying a DCI and/or the TDRA table. For example, any of DCI formats 0_1, 0_2, 1_1, and/or 1_2 may be modified and/or the TDRA tables indexed by any of those DCI formats may also, or alternatively, be modified. Such modifications may allow indication of single or multiple non-contiguous PxSCHs in any slot of the multiple schedule slots.

The TDRA table may be configured to include various numbers of PxSCHs in a row. In some scenarios, this number may be based on subcarrier spacing (SCS) and/or UE capability. For example, if a UE is capable of processing X PxSCHs per aggregate of 4 slots using 960 kHz, then the TDRA table may be configured to include values for 4×PxSCHs per row. Increasing the number of PxSCHs may increase the amount of memory required to process the DCI and/or the PxSCHs, which may constrain the UE capability. In some scenarios, the UE may signal its capability to the BS, and the BS may configure the TDRA table and/or DCI based at least in part on this UE capability.

As discussed above in connection with options 3-4 of each of FIG. 18 and FIG. 19, the TDRA table may be extended to signal parameters for N PxSCHs, which may be non-contiguous in the time domain. FIG. 8 illustrates the first three rows of an example of such a TDRA table for PUSCH, including examples of both contiguous and non-contiguous options, according to some embodiments. As illustrated in FIG. 8, the TDRA table may provide separate K2, SLIV, and mapping type for each PUSCH. FIG. 9 illustrates the first three rows of an example of such a TDRA table for PDSCH, including examples of both contiguous and non-contiguous options, according to some embodiments. As illustrated in FIG. 9, the TDRA table may provide separate K0, DMRS position, SLIV, and mapping type for each PUSCH. In either example, the number of PxSCHs scheduled may be signaled by the number of valid SLIVs included in the row of the TDRA table signaled in the DCI. Thus, the DCI may signal different numbers of PxSCHs by signaling different TDRA indexes. In the examples of FIGS. 8 and 9, each row indicates 5 scheduled PxSCHs. It should be understood that the TDRA tables of FIGS. 8-9 (and other TDRA tables included throughout this disclosure) may each be significantly larger (e.g., 64 rows), but only a few rows are illustrated here, for simplicity.

In some scenarios, additional signaling may be defined to add further flexibility. As a first example of additional signaling, the DCI may include an additional parameter "M" to indicate the number of entries to be used from the identified row of the TDRA table. For example, an UL DCI indicating a value of 3 for the M parameter and a value of 2 for the TDRA index parameter in connection with the TDRA table of FIG. 8 would indicate that 3 PUSCHs were scheduled, with K2 values of 2, 4, and 6. Similarly, a DL DCI indicating a value of 4 for the M parameter and a value of 2 for the TDRA index parameter in connection with the TDRA table of FIG. 9 would indicate that 3 PDSCHs were scheduled, with K2 values of 2, 4, 6, and 8. In either example, a single PxSCH may be signaled by indicating a value of 1 for the M parameter.

As a second example of additional signaling, the DCI may include an additional parameter "enable/disable" to indicate whether each resource set identified in the signaled row of the TDRA table is enabled or disabled. For example, the enable/disable parameter may consist of an N-bit field (or an M-bit field), with one bit indicating whether a respective entry in the signaled row of the TDRA table is enabled. As a specific example, an UL DCI indicating a value of 1 for the TDRA index parameter, and a value of "1, 0, 1, 1, 0" for the enable/disable parameter in connection with the TDRA table of FIG. 8 would indicate that 3 PUSCHs were scheduled, with K2 values of 2, 4, and 5. Using the enable/disable parameter adds greater flexibility by allowing the DCI to dynamically signal both the number and positions of PxSCHs to be transmitted from any row of the TDRA table. Additionally, using the enable/disable parameter may allow finer control of retransmission. For example, in some scenarios, the PDCCH may repeat the scheduling multiple times, based on PDCCH reception reliability. For example, it is possible that the PDCCH may not be reliably received, and the base station may send multiple repetitions of the same PDCCH to the UE to ensure reception. Given that the DCI may be carried in the PDCCH, this may mean retransmission of the DCI. In such scenarios, any PxSCH that has already been sent or received by the base station at the time of retransmission of the DCI may be marked as disabled in the retransmitted DCI. In some scenarios, the new DCI may disable one or more future PxSCH(s) as well. In some scenarios, the enable/disable parameter may not be included in a new field, but may instead be added to an existing field, such as the TDRA index field.

As a third example of additional signaling, a MAC control element (CE), or other signaling, may include an indication to activate or deactivate a subset of rows in a TDRA table. Traditionally, the size (in bits) of the TDRA parameter in the DCI is determined based on the number of rows in the TDRA table, which is configured at higher layers. For multi-TTI scheduling (e.g., scheduling of multiple PxSCHs), the number of rows is likely to be increased compared to single-TDRA configuration, to accommodate both single- and multi-TTI scheduling. This additional overhead may be reduced or avoided by allowing the MAC CE to deactivate a subset of the rows. For example, one or more rows may be deactivated based on recent buffer status information for DL and/or UL. With this approach, the TDRA field size may be determined based on the activated TDRA entries, instead of all RRC-configured entries.

As a specific example, the base station may configure a TDRA table having 16 rows, e.g., by RRC signaling. In the traditional design, the size of TDRA field would be 4 bits. However, by using the MAC CE, the base station may select a subset of these rows, e.g. activating 4 of the 16 rows during a period of time. Thus, the size of the TDRA index parameter may be reduced from 4 bits to 2 bits. It may be noted that this option may trade scheduling flexibility for reduced overhead.

In some scenarios, the SLIV values as shown in Tables 8-9 may come from a "master SLIV" table, such that the SLIV for each PXSCH is not arbitrarily chosen. This may help to avoid very complicated HARQ construction (e.g., for Type 1 codebook).

FIGS. 10-13—Time-Domain Enhancements Using Reduced Signaling

As outlined above, e.g., in connection with option 4 of FIG. 18 and FIG. 19, the DCI may indicate N TDRA indexes, e.g., one for each of the PxSCHs signaled by the DCI. However, expressly including N TDRA indexes in the DCI may be inefficient. Therefore, in some scenarios, the DCI may expressly include 1 TDRA index, e.g., for the first PxSCH, and may then indicate TDRA indexes for the remaining PxSCHs in some more efficient manner; e.g., in a manner that causes the DCI to include less bits.

In some scenarios, consistent with option 4 of FIG. 18 and FIG. 19, the TDRA table may be configured such that one or more of the rows indicates a single value of each applicable parameter (e.g., K2/K0, SLIV, and mapping type, as well as DMRS position for PDSCH).

Other scenarios may use a combination of option 3 and option 4, such that the DCI signals a plurality L of TDRA indexes, where L<N, and the TDRA table is configured such that each row indicates a respective plurality J of values for each applicable parameter, where J<N. FIG. 10 illustrates the first three rows of an example of such a TDRA table for PUSCH, in which J for the first row is 2 ($J_1=2$). As illustrated, $J_2=2$ and $J_3=5$. These values are simply examples, and other values could be used in various scenarios. Defining a TDRA table having one or more rows with J>1 allows the DCI to indicate scheduling of N PxSCHs, while including only L indications, which may reduce signaling overhead in the DCI.

Regardless of whether each/any row of the TDRA table includes multiple values, overhead may be further reduced through offset signaling. For example, the DCI may include one normal TDRA index (e.g., 6 bits) to indicate resource assignment for one or more PxSCHs, and may then include one or more index offsets to indicate resources assignments for the remaining PxSCHs. An index offset may have less bits (e.g., 3 bits) than a TDRA index.

As one example, FIG. 11 illustrates possible values mapped to a 3-bit index offset field. FIG. 11 is simply one example, and many other values are possible. As illustrated, the index offset may include any bit value from 0 through 7. Each bit value may indicate an offset value, which may range from −3 through 4. Each offset value may indicate a differential offset relative to the first TDRA index.

For example, a DCI may signal scheduling of four PUSCHs using the tables of FIGS. 10-11. The DCI may include a 6-bit TDRA index parameter of 1, and a 3-bit index offset of 4. The TDRA index parameter of 1 identifies row 1 of the TDRA table, which indicates K2 values of 2 and 3. The table of FIG. 11 translates the index offset of 4 to an offset value of 1. This identifies row 2 of the TDRA table, as row 2 is +1 from the row identified by the preceding TDRA index parameter. Thus, in this case, the index offset of 4 indicates K2 values of 5 and 7.

Figure 12:
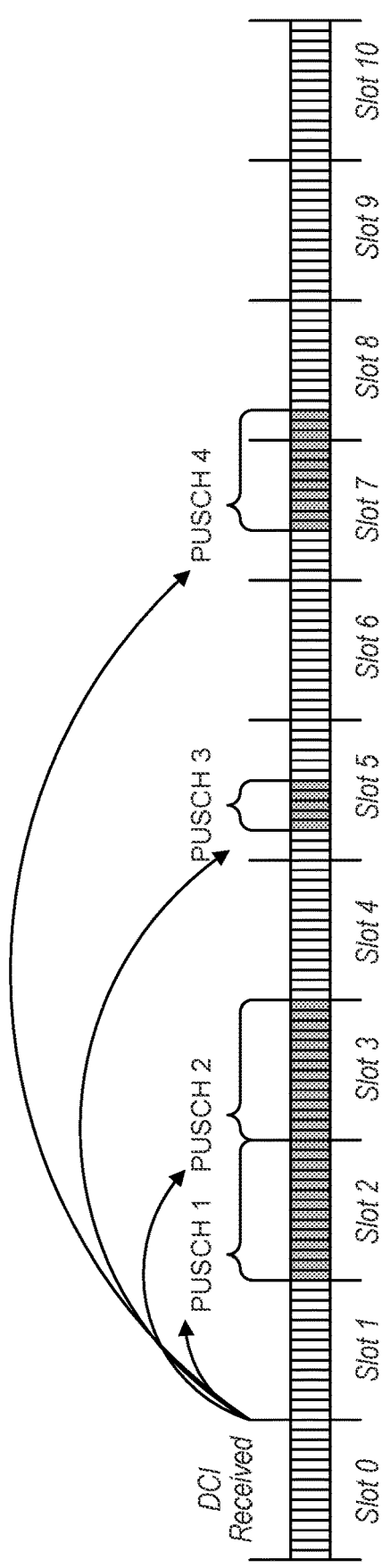
FIGS. 12-13 are time-domain resource diagrams illustrating example resource assignments for multi-PxSCH transmissions, according to some embodiments.

As one option, the K2 values indicated by the index offset may be relative to the DCI. In that case, the DCI described above would indicate that PUSCHs are scheduled in the slots that fall 2, 3, 5, and 7 slots after the slot in which the DCI was received. FIG. 12 illustrates this option. As illustrated, the DCI is received in slot 0. Therefore, the four PUSCHs are scheduled to begin at slot 2 (symbol 0), slot 3 (symbol 0), slot 5 (symbol 3), and slot 7 (symbol 5), all of which are clearly indicated in rows 1 and 2 of the TDRA table shown in FIG. 10.

Figure 13:
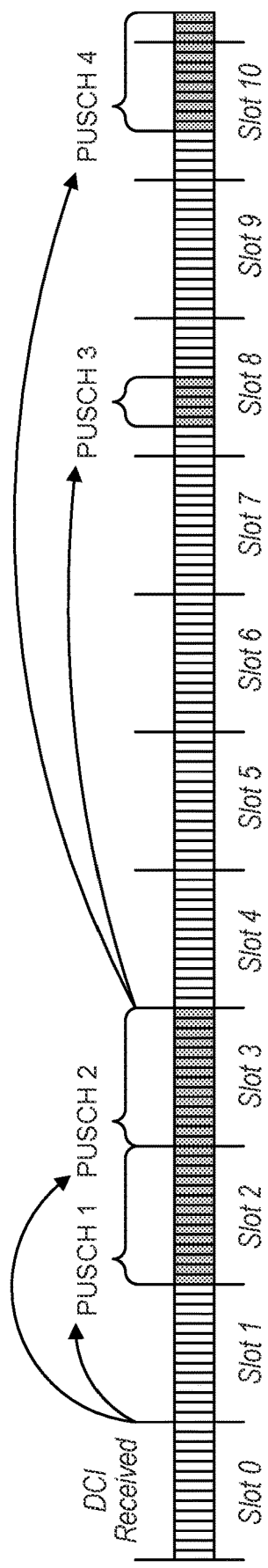

As another option, the K2 values indicated by the index offset may be relative to the latest slot previously indicated. FIG. 13 illustrates this option. As illustrated, the DCI is again received in slot 0. As previously described, the TDRA index parameter identifies Row 1 of the TDRA table, indicating K2 of 2 and 3, which indicates that two PUSCHs are scheduled after a delay of 2 and 3 slots relative to the slot 0.

Thus, PUSCHs are scheduled to begin at slot 2 (symbol 0), slot 3 (symbol 0), just as in the example of FIG. 12. Additionally, the index offset identifies row 2, indicating K2 of 5 and 7. However, in the example of FIG. 13, those K2 values are treated as relative to the latest K2 value previously indicated by the DCI. Because the latest K2 value indicated by the TDRA index is 3, the index offset indicates that two additional PUSCHs are scheduled to begin at slot 8 (symbol 3) and slot 10 (symbol 5), as those are the locations represented by K2 of row 2, relative to a K2 value of 3.

In a slight variation of this option, the K2 values may be treated as relative to the latest slot previously indicated by the DCI. Because the latest slot indicated by the TDRA index is slot 3, the index offset indicates that two additional PUSCHs are scheduled to begin at slot 8 (symbol 3) and slot 10 (symbol 5). Thus, in the present example, this variation yields the same result, as illustrated in FIG. 13. However, in other examples, e.g., where the DCI includes multiple index offset values, this variation may yield very different results.

In a further variation of this option, the starting point of a scheduled transmission of a PUSCH may be further relative to the SLIV of the preceding PUSCH. For example, instead of PUSCH3 beginning in the slot that is 5 slots after the start of PUSCH2, PUSCH3 may instead begin 5 slots after the slot in which PUSCH2 ends. Again, in the present example of FIG. 13, this distinction has no impact, because PUSCH2 begins and ends in slot 3. However, if PUSCH2 were to extend into slot 4, that would cause PUSCH3 to begin one slot later than in the present example; i.e., slot 9.

As a result of treating K2 values as relative to previously indicated slots in this manner, there may be less need for rows in the TDRA table to include large K2 values, which may allow for use of a smaller TDRA index table (thereby reducing signaling overhead in the DCI and/or in RRC signaling) and/or allow for additional diversity among the rows of the TDRA table.

In a DL example, K0 may be similarly treated as relative to either the DCI or the previously indicated PDSCH. K1 may also be treated as relative to either the DCI or the previously indicated PDSCH, or K1 may be treated as relative to the position of the associated PDSCH.

It should be noted that similar differential signaling may be applied to additional fields, such as the MCS parameter(s) and/or the HARQ process number parameter.

In another variation, the DCI may include one normal TDRA index (e.g., 6 bits) to indicate resource assignment for one or more PxSCHs, and may then include one or more secondary indexes to indicate resources assignments for the remaining PxSCHs. A secondary index may have less bits (e.g., 2 bits) than a TDRA index, and may serve as a table index into a secondary TDRA table, which may be smaller than the standard TDRA table (e.g., four rows). Each row of the secondary TDRA table may include some or all of the parameters included in a row of the standard TDRA table, but the values may be treated as relative to the DCI or to the previously indicated K2 or slot, e.g., as described above. The values included in the rows of the secondary TDRA table may be selected to provide versatility in selecting resources relative to the previously indicated PUSCHs. For example, large K2 values may not be needed in the secondary TDRA table, as the DCI is likely to signal PUSCHs that begin relatively soon after the preceding PUSCH, even though such PUSCHs may be scheduled in slots that are a large number of slots after the DCI.

In some scenarios, to avoid increased RRC signaling overhead, the secondary TDRA table may be (or include) a subset of the standard TDRA table. For example, a number of rows (e.g., the first four rows) of the TDRA table may be designated to also serve as the secondary TDRA table. Thus, while the DCI may include a TDRA index indicating any row of the TDRA table to signal a first set of one or more PxSCH(s), each subsequent set of one or more PxSCH(s) indicated by the DCI may be scheduled only within resources that may be indicated by the values in one or more of the four rows of the secondary TDRA table, relative to the preceding set of PxSCHs.

In some scenarios, the features described in connection with FIGS. 10-13 may be combined with those described in connection with FIGS. 8-9.

Figure 14:
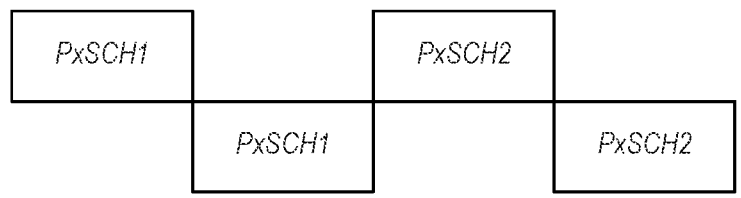
FIGS. 14-16 are time/frequency-domain diagrams illustrating example frequency hopping configurations for use with multi-PxSCH transmissions, according to some embodiments.
Figure 15:
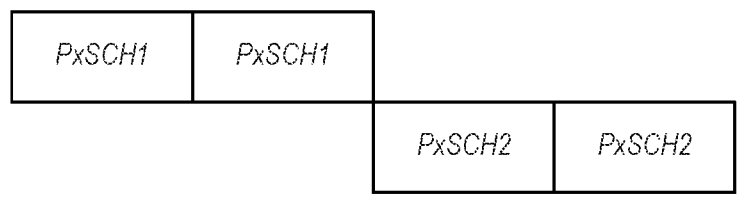
Figure 16:
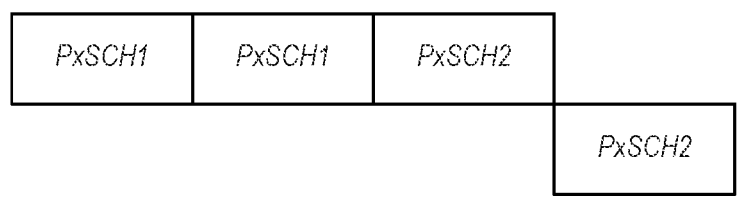

FIGS. 14-16—Frequency-Domain Enhancements

As outlined above, multi-TTI PxSCH scheduling may include frequency hopping. As shown in FIG. 18 and FIG. 19, a DCI may include a single FDRA index, or may include multiple FDRA indexes, e.g., for each TTI, each PxSCH, etc. Various options may be adopted to provide efficient signaling of frequency hopping configurations for multi-TTI PxSCH transmissions.

As a first option, a DCI may include a single FDRA indication, such as an FDRA index, which may indicate a frequency hopping configuration that applies to all associated TTIs, to cause a fixed frequency hopping pattern within each TTI. For example, as illustrated in FIG. 14, the first TB of each TTI may be scheduled at a first frequency, and the second TB of each TTI may be scheduled at a second, different frequency. In this example, each TTI may use the FDRA signaled in the DCI. This may provide equal diversity for each TTI. However, under this configuration, if a single OFDM communication is used (i.e., having only one TB), the TTI may not include frequency hopping.

As a second option, a DCI may again include a single FDRA indication, which may indicate a frequency hopping configuration that applies to all associated TTIs. However, in this option, each TTI may use a combination of the FDRA signaled and the relative position in the sequence of TTIs to select frequency-domain resources. For example, as illustrated in FIG. 15, the TBs of the first TTI (and the third, fifth, etc.) may be scheduled at a first frequency, and the TBs of the second TTI (and the fourth, sixth, etc.) may be scheduled at a second frequency. This option may cause the TTIs to have different diversity performance, e.g., if performance of at one frequency is better.

As a third option, a DCI may include an FDRA indication for each TTI. This may allow use of frequency hopping for only those TTIs for which it is specifically desired. For example, as illustrated in FIG. 16, the DCI may include an FDRA indication for the second TTI to include intra-TTI frequency hopping (e.g., similar to that of the first option), but not for the first TTI.

As a fourth option, the DCI may again include a single FDRA indication to indicate a frequency hopping configuration that applies to all associated TTIs. In this option, each PxSCH may be split into two segments (e.g., in half), and frequency hopping may be implemented between the two segments. In some scenarios, a PxSCH that is too short may not be split.

As a fifth option, PxSCHs within the same slot may be set to the same frequency location, and the frequency location may alternate between slots. This option may help to avoid fragmentation of system resources.

In some scenarios, the frequencies (or a frequency offset between the first and second frequencies) used during frequency hopping may be signaled in the DCI, e.g., for each PxSCH. For example, the DCI may include an index to a frequency-domain (FD) offset table, e.g., similar to the offset signaling discussed previously, in order to reduce signaling overhead.

In some scenarios, frequency offset may be used, rather than predefined frequency hopping. For example, instead of including a flag to activate a predefined hopping configuration, the DCI may include an indication to shift in frequency by some offset amount, e.g., relative to the most recent previous frequency or relative to an original frequency. This may add flexibility, as the shift may be implemented on demand, and the frequency may be shifted to a desired degree. However, this may be achieved at the price of increased signaling overhead. Signaling an offset may nevertheless require less signaling overhead than expressly indicating a new configuration. E.g., this may allow a change in the FDRA, without need for a full FDRA information transmission. To reduce signaling overhead, the DCI may include an index to a table of offset values.

In some scenarios, a change in FD resources signaled for a PxSCH may be applied to one or more subsequent PxSCHs, e.g., until the end of the TTI, or until the end of the multi-PxSCH transmission.

In some scenarios, the RRC configuration may be tied to the frequency allocation.

Capability Definition

Various implementations of the systems and methods disclosed above may operate with different numbers of PxSCHs per slot/multi-slot.

As a first option, only one PxSCH may be allowed per slot.

As a second option, the number of PxSCHs allowed may be variable, e.g., based on SCS and/or UE capability. For example, the number of slots may be fixed, but the number of PxSCHs may be configurable, e.g., up to N per 8 slots when operating at 960 kHz, and up to N per 4 slots when operating at 480 kHz. The base station may configure up to N PxSCHs per fixed number of slots. As another example, both the number of slots and the number of PxSCHs may be configurable. E.g., the number of PxSCHs may be configurable up to N PxSCHs per M slots. The base station may configure a UE with these values to determine TDRA size, e.g., based on UE capability.

Figure 17:
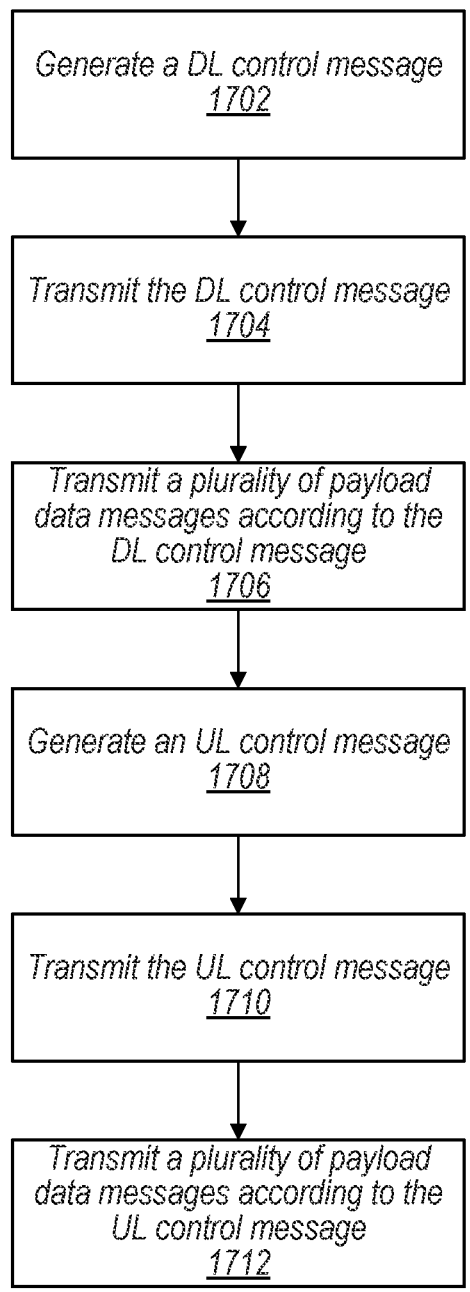
FIG. 17 is a flow diagram illustrating an example method for communicating payload data messages, according to some embodiments.

FIG. 17—Method for Communicating Payload Data Messages

FIG. 17 is a flow diagram illustrating an example method for communicating payload data messages, according to some embodiments. The method of FIG. 17 may be performed by a base station in a wireless communication network, such as the base station 102, or by a portion thereof, such as the processor(s) 404, the radio 430, and/or the communication chain 432. The method illustrated in FIG. 17 is one example, and numerous variations are possible. For example, in some scenarios, one or more elements of FIG. 17 may be reordered or omitted, and/or additional elements may be added. As specific examples, elements 1702-1706 may be omitted, or elements 1708-1712 may be either omitted or performed prior to, concurrently with, or interleaved with elements 1702-1706.

At 1702, the base station 102 may generate a DL control message. In some scenarios, the DL control message may include a DCI. The DL control message may indicate DL transmission resources allocated for a plurality of payload data messages. For example, the plurality of payload data messages may include TBs to be transmitted on PDSCH. In some scenarios, the base station 102 may generate the DL control message indicating DL transmission resources allocated for a plurality of payload data messages at least partly in response to determining that at least one of the plurality of payload data messages will be transmitted within a particular frequency range, such as above 52.6 GHz. For example, in some scenarios, if the payload data messages will be transmitted at lower frequency ranges, then the base station 102 may generate a separate DL control message for each payload data message, e.g., consistent with traditional practice.

At 1704, the base station 102 may transmit the DL control message, e.g., to one or more UEs, such as the UE 106. Specifically, the base station 102 may transmit the DL control message at least to one or more UEs to which the plurality of payload data messages are addressed.

At 1706, the base station 102 may transmit the plurality of payload data messages according to the DL control message. For example, the base station 102 may transmit the plurality of payload data messages according to the allocated downlink transmission resources, e.g., to the one or more UEs to which the payload data messages are addressed.

In various scenarios, the DL control message may be generated in a configuration consistent with any of the preceding discussion. For example, in some scenarios, the allocated downlink transmission resources may include transmission resources that are non-contiguous in time.

In some scenarios, the control message may include an indication of respective time-domain resources allocated to each of the payload data messages. For example, the indication of respective time-domain resources may identify a respective start time and duration for each of the payload data messages. In some scenarios, this identification of a start time and duration may take the form of K0 and SLIV values, as discussed above in connection with TDRA tables.

As a specific example, the indication may include an index to a table of DL resource assignments, such as a TDRA table. The index may indicate a single entry of the table that identifies the respective time-domain resources allocated to each of the payload data messages, e.g., as discussed in connection with FIG. 9.

As another example, for each of the payload data messages, the indication may include a respective index to a table of DL resource assignments, such as a TDRA table. Each index may indicate a different entry of the table, wherein each indicated entry of the table identifies the respective time-domain resources allocated to the associated payload data message, e.g., as discussed in connection with option 4 of FIG. 19.

As yet another example, the indication may include an index to a table of DL resource assignments, such as a TDRA table, and at least one offset value. The index may indicate a first entry of the table, and that first entry may identify the respective time-domain resources allocated to at least a first of the payload data messages. In some scenarios, the first entry of the table may identify respective time-domain resources allocated to a plurality of the data messages. Such a table may be a DL TDRA table similar to the UL TDRA table discussed in connection with FIG. 10. The at least one offset value may identify a second entry of the table by identifying the position of the second entry relative to the first entry, e.g., according to any of the differential offset signaling discussed in connection with FIGS. 10-13. The second entry may identify the respective time-domain resources allocated to at least a second of the payload data messages.

In connection with some or all of the examples that include indicating entries of a table, each indicated entry of the table may include at least one value indicating a slot in which transmission of a respective payload data message is scheduled to begin. In some scenarios, this slot may be indicated by specifying a delay between the slot in which the control message is transmitted and the slot in which transmission of the respective payload data message is scheduled to begin. For example, the indicated entry may include a K0 value, referenced relative to the DCI, e.g., as discussed in connection with FIGS. 10 and 12. In other scenarios, this slot may be indicated by specifying a delay between the slot in which the latest of the respective first payload data messages is scheduled to begin and the slot in which each respective second payload data message is scheduled to begin. For example, the indicated entry may include a K0 value, referenced relative to the latest slot signaled for preceding payload data messages, e.g., as discussed in connection with FIGS. 10 and 13.

As yet another example, the indication may include a first index to a first table of DL time-domain resource assignments, such as a TDRA table, and a second index to a second table of time domain resource assignments, such as the secondary TDRA table discussed above. As discussed above, the first index may indicate an entry of the first table, wherein the entry of the first table may include at least one value (e.g., a K0 value) indicating a slot in which transmission of a respective first payload data message is scheduled to begin, by specifying a delay between the slot in which the control message is transmitted and the slot in which transmission of the respective first payload data message is scheduled to begin. The second index may occupy less bits of the control message than the first index. The second index may indicate an entry of the second table, wherein the entry of the second table includes at least one value indicating a slot in which transmission of a respective second payload data message is scheduled to begin, by specifying a delay between the slot in which the latest of the respective first payload data messages is scheduled to begin and the slot in which each respective second payload data message is scheduled to begin.

In some scenarios, for each of the payload data messages, the control message may indicate a resource allocation for transmitting an acknowledgement (ACK) feedback message responsive to the respective payload data message.

In some scenarios, the control message may include an indication of a frequency hopping configuration for each TTI. In some scenarios, the control message may include any other indication discussed above of frequency hopping configuration.

At 1708, the base station 102 may generate an UL control message, such as a DCI. In some scenarios, the DL control message may include a DCI. The UL control message may indicate UL transmission resources allocated for a second plurality of payload data messages. For example, the second plurality of payload data messages may include TBs to be transmitted on PUSCH. Again, the base station 102 may, in some scenarios, generate the UL control message for a plurality of payload data messages at least partly in response to determining that at least one of the second plurality of payload data messages will be transmitted within a particular frequency range, such as above 52.6 GHz.

Examples

A method for communicating payload data messages in a wireless communication network may be performed by a base station of the wireless communication network. The method may include: transmitting a control message indicating uplink transmission resources allocated for a plurality of payload data messages, wherein the uplink transmission resources are non-contiguous in the time domain; and receiving the plurality of payload data messages according to the allocated uplink transmission resources.

In some scenarios, the control message may include an indication of respective time-domain resources allocated to each of the payload data messages, wherein the indication of respective time-domain resources identifies a respective start time and duration for each of the payload data messages.

The UL control message may include features similar to any of those discussed above in connection with the DL control message generated at 1702. Additionally, the UL control message may include any of the features included in the preceding discussion of multi-PUSCH signaling.

At 1710, the base station 102 may transmit the UL control message, e.g., to one or more UEs, such as the UE 106. Specifically, the base station 102 may transmit the UL control message at least to one or more UEs to which the second plurality of payload data messages are addressed.

At 1712, the base station 102 may receive the second plurality of payload data messages according to the UL control message. For example, the base station 102 may receive the plurality of payload data messages according to the allocated UL transmission resources, e.g., from the one or more UEs to which the UL grants were assigned in the UL control message.

Examples

A method for communicating payload data messages in a wireless communication network may be performed by a base station of the wireless communication network. The method may include: transmitting a control message indicating uplink transmission resources allocated for a plurality of payload data messages, wherein the uplink transmission resources are non-contiguous in the time domain; and receiving the plurality of payload data messages according to the allocated uplink transmission resources.

In some scenarios, the control message may include an indication of respective time-domain resources allocated to each of the payload data messages, wherein the indication of respective time-domain resources identifies a respective start time and duration for each of the payload data messages.

It will be appreciated that various examples above and in the Figures may be illustrated with respect to UL or DL transmissions. These directions are exemplary only. An example shown/discussed in terms of PDSCH may similarly apply to PUSCH and vice versa, etc. For instance, the techniques described with respect to HARQ acknowledgement as an implicit indication (e.g., in FIGS. 15 and 16) may be applied to PUSCH transmissions acknowledged by a base station, according to some embodiments.

Any of the methods described herein for operating a base station (BS) may be the basis of a corresponding method for operating a UE, by interpreting each message/signal X received by the BS in the UL as message/signal X transmitted by the UE, and each message/signal Y transmitted in the DL by the BS as a message/signal Y received by the UE. Moreover, a method described with respect to a UE may be interpreted as a method for a BS in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a BS 102, or UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
at least one memory element; and
processing circuitry coupled to the at least one memory element, the processing circuitry configured to:
transmit a control message indicating downlink transmission resources allocated for a plurality of payload data messages, wherein the control message includes an indication of respective time-domain resources allocated to each of the payload data messages, wherein the indication includes:
an index to a table of resource assignments, wherein the index indicates a first entry of the table, the first entry identifying the respective time-domain resources allocated to at least a first of the payload data messages; and
at least one offset value that identifies a second entry of the table by identifying the position of the second entry relative to the first entry, the second entry identifying the respective time-domain resources allocated to at least a second of the payload data messages, wherein the at least one offset value is distinct from the index; and
transmit the plurality of payload data messages according to the allocated downlink transmission resources.

2. The apparatus of claim 1, wherein the plurality of payload data messages is transmitted on a physical downlink shared channel (PDSCH).

3. The apparatus of claim 1, wherein the control message is a downlink control indicator (DCI).

4. The apparatus of claim 1, wherein the allocated downlink transmission resources include transmission resources that are non-contiguous in time.

5. The apparatus of claim 1, wherein the processing circuitry is further configured to:
generate the control message, wherein the generating includes configuring the control message to include allocation of the downlink transmission resources for the plurality of payload data messages in response to determining that at least one payload data message of the plurality of payload data messages will be transmitted within a particular frequency range.

6. The apparatus of claim 1, wherein the indication of respective time-domain resources identifies a respective start time and duration for each of the payload data messages.

7. The apparatus of claim 1, wherein each indicated entry of the table includes at least one value indicating a slot in which transmission of a respective payload data message is scheduled to begin, by specifying a delay between the slot in which the control message is transmitted and the slot in which transmission of the respective payload data message is scheduled to begin.

8. The apparatus of claim 1,
wherein the first entry of the table includes at least one value indicating a slot in which transmission of a respective first payload data message is scheduled to begin, by specifying a first delay between the slot in which the control message is transmitted and the slot in which transmission of the respective first payload data message is scheduled to begin, wherein the delay is greater than zero, and
wherein the second entry of the table includes at least one value indicating a slot in which transmission of a respective second payload data message is scheduled to begin, by specifying a second delay between the slot in which the latest of the respective first payload data messages is scheduled to begin and the slot in which each respective second payload data message is scheduled to begin.

9. The apparatus of claim 1, wherein, for each of the payload data messages, the control message further indicates a resource allocation for transmitting an acknowledgement (ACK) feedback message responsive to the respective payload data message.

10. The apparatus of claim 1, wherein the control message includes an indication of a frequency hopping configuration for each transport time interval (TTI).

11. The apparatus of claim 1, wherein the processing circuitry is further configured to:
transmit a second control message indicating uplink transmission resources allocated for a second plurality of payload data messages; and
receive the second plurality of payload data messages according to the allocated uplink transmission resources.

12. The apparatus of claim 11, wherein the second plurality of payload data messages is received on a physical uplink shared channel (PUSCH).

13. A base station for communicating in a wireless communication network, the base station comprising:

transceiver circuitry configured to transmit and receive wireless communication signals; and processing circuitry coupled to the transceiver circuitry, the processing circuitry configured to cause the base station to:

transmit a control message indicating downlink transmission resources allocated for a plurality of payload data messages, wherein the control message includes an indication of respective time-domain resources allocated to each of the payload data messages, wherein the indication includes:

an index to a table of resource assignments, wherein the index indicates a first entry of the table, the first entry identifying the respective time-domain resources allocated to at least a first of the payload data messages; and at least one offset value that identifies a second entry of the table by identifying the position of the second entry relative to the first entry, the second entry identifying the respective time-domain resources allocated to at least a second of the payload data messages, wherein the at least one offset value is distinct from the index; and transmit the plurality of payload data messages according to the allocated downlink transmission resources.

14. A non-transitory computer-readable memory medium storing software instructions that, when executed by a processor of a base station in a wireless communication network, cause the processor to:

provide for transmission a control message indicating downlink transmission resources allocated for a plurality of payload data messages, wherein the control message includes an indication of respective time-domain resources allocated to each of the payload data messages, wherein the indication includes:

an index to a table of resource assignments, wherein the index indicates a first entry of the table, the first entry identifying the respective time-domain resources allocated to at least a first of the payload data messages; and at least one offset value that identifies a second entry of the table by identifying the position of the second entry relative to the first entry, the second entry identifying the respective time-domain resources allocated to at least a second of the payload data messages, wherein the at least one offset value is distinct from the index; and provide for transmission the plurality of payload data messages according to the allocated downlink transmission resources.

15. The non-transitory computer-readable memory medium of claim 14, wherein the indication of respective time-domain resources identifies a respective start time and duration for each of the payload data messages.

16. The non-transitory computer-readable memory medium of claim 14, wherein the software instructions, when executed, further cause the base station to:

transmit a second control message indicating uplink transmission resources allocated for a second plurality of payload data messages; and receive the second plurality of payload data messages according to the allocated uplink transmission resources.

* * * * *